United States Patent
Porcs et al.

(10) Patent No.: US 8,672,392 B1
(45) Date of Patent: Mar. 18, 2014

(54) CRASH ABSORPTION INSTRUMENT PANEL SUBSTRATE

(71) Applicant: Toyota Motor Engineering & Manufacturing North America, Inc., Erlanger, KY (US)

(72) Inventors: Robert Anthony Porcs, Waterford, MI (US); Raymond David Howe, Taylor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/629,666

(22) Filed: Sep. 28, 2012

(51) Int. Cl.
*B62D 25/14* (2006.01)

(52) U.S. Cl.
USPC .......... 296/187.05; 296/70; 180/90; 280/748

(58) Field of Classification Search
USPC ................. 296/70, 187.05; 180/90; 280/748
See application file for complete search history.

(56) References Cited

U.S. PATENT DOCUMENTS

| | | | |
|---|---|---|---|
| 5,067,747 A | 11/1991 | Yokoyama | |
| 5,174,621 A * | 12/1992 | Anderson | 296/70 |
| 6,116,647 A | 9/2000 | Fischer et al. | |
| 6,971,701 B2 * | 12/2005 | Doll et al. | 296/72 |
| 7,891,726 B2 * | 2/2011 | Gavrilov | 296/187.05 |
| 7,913,790 B2 | 3/2011 | Tanaka et al. | |
| 2009/0107278 A1 | 4/2009 | Vermeersch | |

FOREIGN PATENT DOCUMENTS

WO  WO 2008022810 A1 *  2/2008

* cited by examiner

*Primary Examiner* — Dennis Pedder
*Assistant Examiner* — Beverly Becker
(74) *Attorney, Agent, or Firm* — Gifford, Krass, Sprinkle, Anderson & Citkowski, P.C.

(57) ABSTRACT

An instrument panel assembly of an automotive vehicle is provided wherein the instrument panel is operable to hold a meter cluster. The meter cluster is positioned adjacent to a shifter of an automotive vehicle. The meter cluster is mounted within the center of the vehicle. The instrument panel includes a main panel having a plurality of apertures located adjacent to the meter cluster. A mounting aperture for the meter cluster is provided wherein the meter cluster is mounted to the mounting aperture for the meter cluster. The plurality of apertures on the main panel located adjacent to the meter cluster are operable to weaken the structure of the main panel to facilitate a controlled collapse of the instrument panel when the shifter hits the meter cluster. The positioning of the apertures located adjacent to the meter cluster prevents damage to the meter cluster during the accident.

12 Claims, 4 Drawing Sheets

CRASH ABSORPTION INSTRUMENT PANEL SUBSTRATE

FIELD OF THE INVENTION

This invention relates generally to instrument panels. More specifically, this invention relates to an instrument panel having absorption characteristics.

BACKGROUND OF THE INVENTION

Instrument panels are well known for use in vehicles allowing for mounting and connection of various components to the interior of a vehicle. It is well known to use an instrument panel to connect a meter cluster within the vehicle. The positioning of the meter cluster is moving towards the trend of having the meter cluster located within the center of instrument panel of the vehicle thereby giving the vehicle a unique appearance. However, placement of the meter cluster in the center of the instrument panel requires additional structure on the instrument panel. This additional structure makes the assembly very strong thereby not providing for a clean break, or easy break, during the event of an accident and thus damaging the meter cluster.

Traditionally, the meter cluster is mounted on the instrument panel above the steering wheel, steering column and shifter. The new arrangement providing for the meter cluster disposed on the center of the instrument panel increases the amount of structure required on the instrument panel. This arrangement provides for the shifter to extend over a front surface of the meter cluster. In the event of an accident, the shifter contacts the front surface of the meter cluster and may damage the meter cluster as the instrument panel structure is too strong. The steering column shifter may also damage other components located on the instrument panel within the vehicle if a similar concept is applied. As such, there exists a need in the art to reduce the damage created and caused by the placement of the meter cluster in relation to the steering column shifter.

SUMMARY OF THE INVENTION

The present invention provides for an instrument panel assembly of an automotive vehicle wherein the instrument panel is operable to mount and hold a meter cluster. The meter cluster is positioned adjacent to a shifter of an automotive vehicle. The meter cluster is mounted on the center of the instrument panel of the vehicle. The instrument panel includes a main panel having a plurality of apertures located adjacent to the meter cluster. A mounting aperture for the meter cluster is provided wherein the meter cluster is mounted to the mounting aperture for the meter cluster. The plurality of apertures on the main panel located adjacent to the meter cluster are operable to weaken the structure of the main panel to facilitate breakage and a controlled collapse of the instrument panel when the shifter hits the meter cluster in the event of an automotive vehicle accident. The positioning of the apertures located adjacent to the meter cluster prevents damage to the meter cluster during an accident.

DETAILED DESCRIPTION OF THE PREFERRED EMBODIMENTS

The present invention provides for including absorption characteristics within an instrument panel allowing for a controlled collapse of the instrument panel upon impact during an accident. The instrument panel includes a plurality of apertures located adjacent to a mounted object to the instrument panel. The apertures are operable to weaken the overall structure of the instrument panel assembly thereby allowing for a controlled collapse of the instrument panel during an accident. The apertures are positioned on surfaces adjacent to, behind, and at various corners and surfaces surrounding a meter cluster. When the shifter from the steering column hits a front surface of the meter cluster during an accident, the meter cluster pushes forward of the vehicle thereby breaking various portions of the instrument panel created by the apertures which created weakened portions of the instrument panel.

Figure 1:
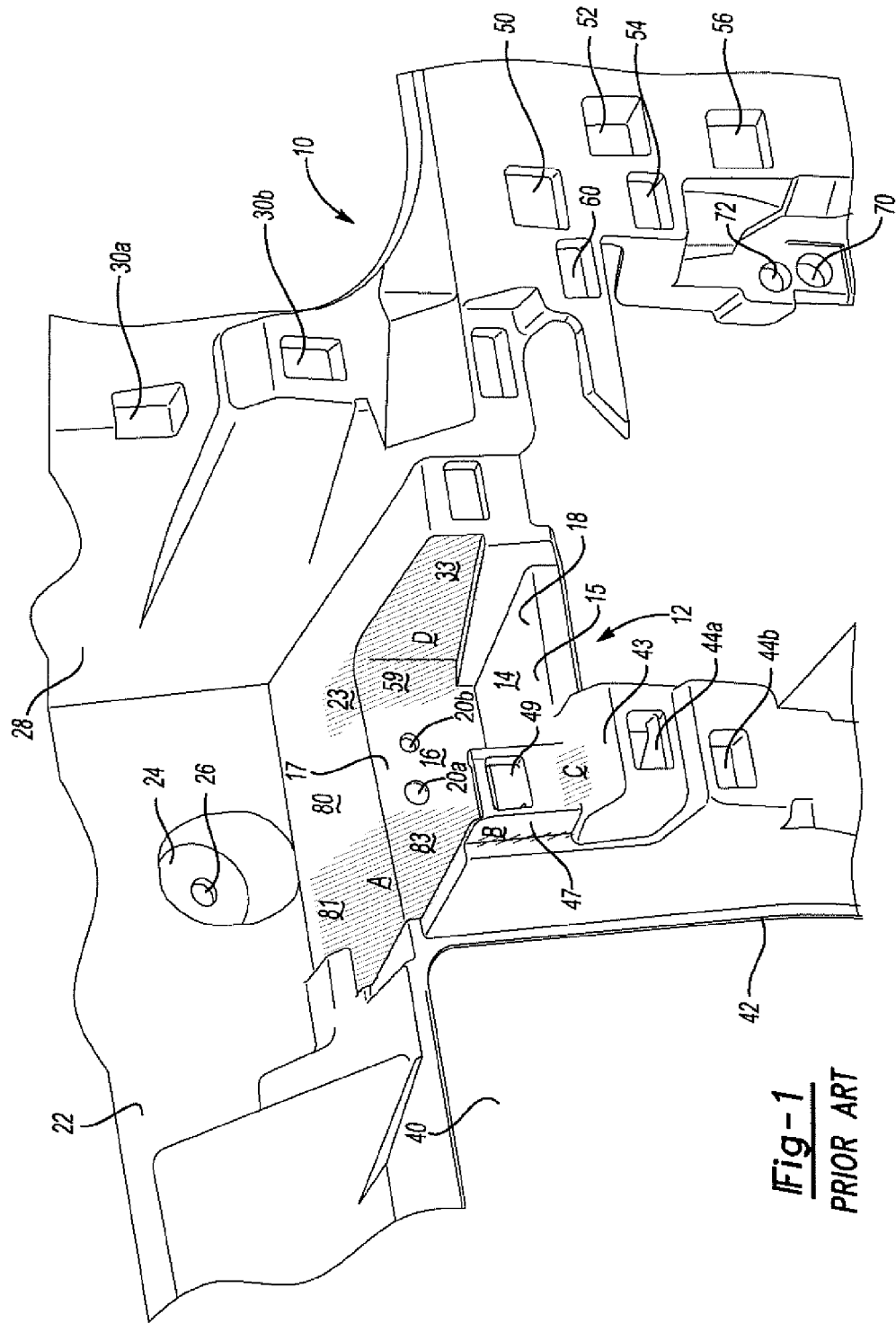
FIG. 1 illustrates a perspective view of the prior art.

FIG. 1 illustrates a perspective view of the prior art. The instrument panel 10 includes a meter cluster mounting area 12. The meter cluster mounting area 12 includes a lower surface 14 provided on a panel 15. The meter cluster mounting area 12 further includes a rear surface 16 connected to the panel 17. The meter cluster mounting area 12 includes an open area 18 operable to accept a meter cluster. The rear surface 16 further includes meter cluster mounting apertures 20a, 20b. The meter cluster is mounted within the open area 18 and rests on the lower surface 14. The meter cluster is mounted to the instrument panel 10 by means of the apertures 20a, 20b. Various attachment means may be provided, such as a bolt assembly, for securing the meter cluster to the meter cluster mounting area 12.

The instrument panel 10 further includes an upper portion 22 having trim mounting attachment means 24, 26. The upper portion 22 further includes a side portion 28 adding further structure to the instrument panel 10. Various attachment structures 30a, 30b are provided for attaching various instruments to the instrument panel or for attaching the instrument panel 10 to the vehicle.

Various other attachment structures are provided on a lower portion 42 of the instrument panel 10. Attachment structures 44a, 44b are provided for either attaching various instruments to the instrument panel 10 or for attaching the instrument panel 10 to the vehicle. Further, other attachment structures 50, 52, 54, 56, 148 are provided for the same purposes. Further, apertures 60, 70, 72 are further provided for the same purpose.

Figure 3:
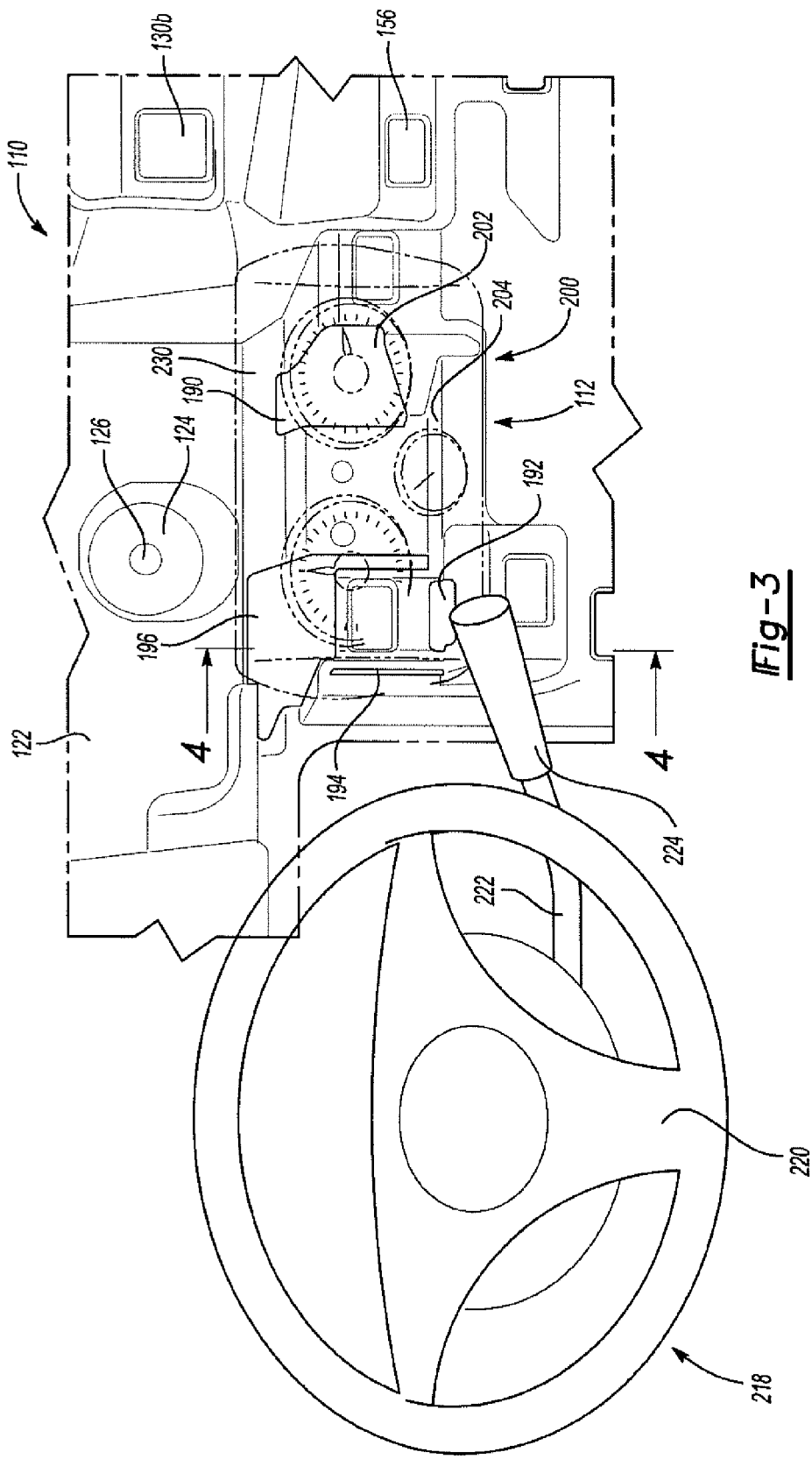
FIG. 3 illustrates a frontal view of the instrument panel showing the crossover of the shifter and meter cluster.

Open area 40 is provided to illustrate the area where the steering wheel, steering column, and shifter are located. Examples of the positioning are shown in FIG. 3.

FIG. 1 of the prior art illustrates the various areas where apertures are created to weaken the structure of the instrument panel 10. Shaded areas A, B, C, D are provided to illustrate the areas where weakening is required. Shaded area A is defined at an upper portion 80 having an upper surface 81 and a surface 83 extending normal to, or generally perpendicular, and extending away from the upper surface 81 to lower surface 14. The shaded area A is the area for which aperture 196 is created.

Shaded area B is defined by the corner portion between surfaces 47 and 49. Shaded area B defines what becomes aperture 194.

Shaded area C located on a surface 43 of the instrument panel 10 is provided to weaken the instrument panel 10. Shaded area C defines where aperture 192 is provided.

Shaded area D is defined by the inner section of surfaces 23, 33, 59. When these surfaces 23, 33, 59 are removed, the shaded area D becomes aperture 190.

Figure 2:
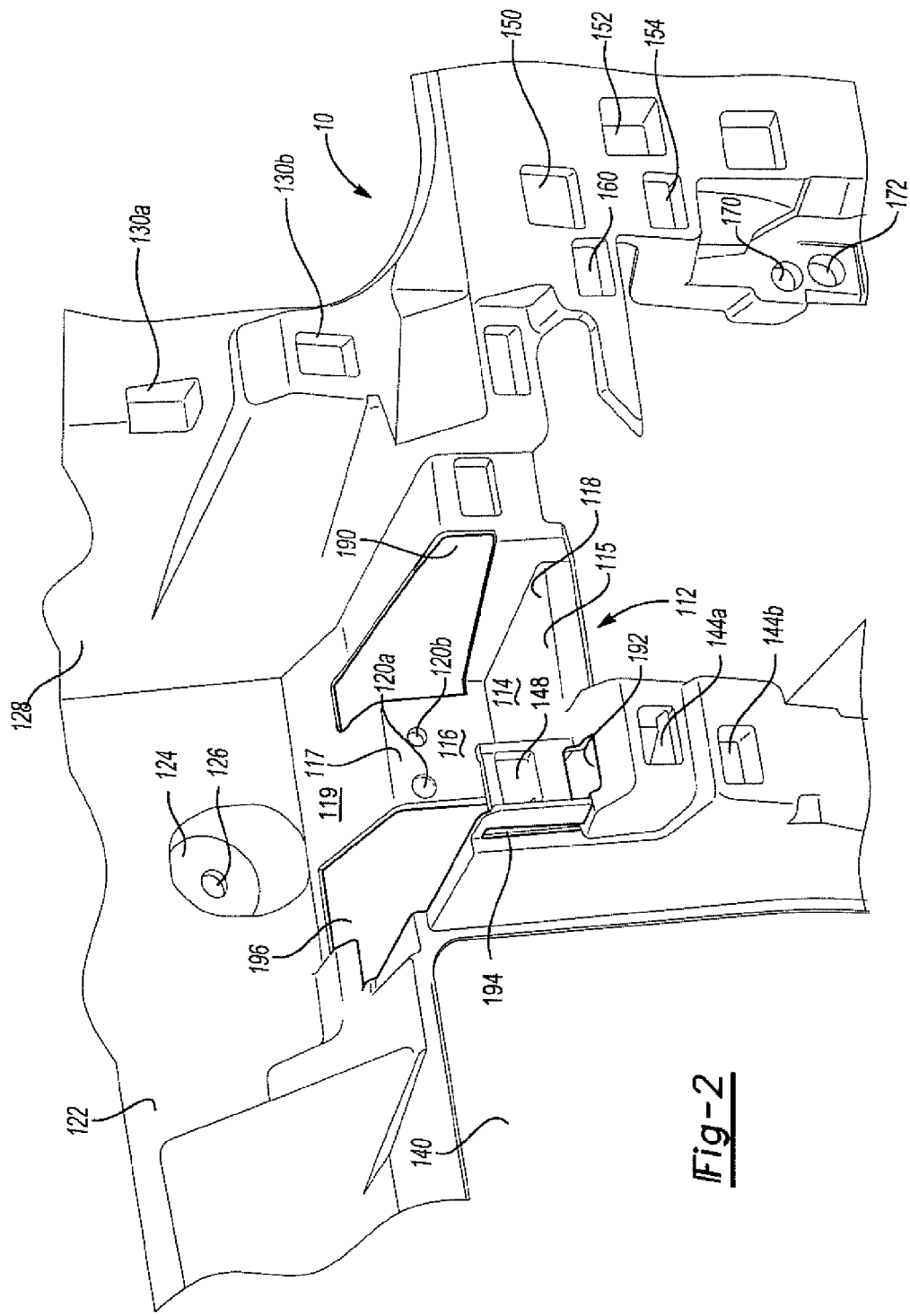
FIG. 2 illustrates the main panel structure having the apertures of the present invention.

FIG. 2 illustrates the instrument panel 110 of the present invention. The apertures 190, 192, 194, 196 are shown provided adjacent a meter cluster mounting area, or main panel, 112. The meter cluster mounting area 112 is defined by a lower surface 114 on a lower panel 115. The meter cluster mounting area 112 further includes a rear surface 116 on the panel 117. The rear surface 116 further includes meter cluster mounting apertures 120a, 120b. The surfaces 114, 116 along with the apertures 190, 192, 194, 196 define an open area 118. A meter cluster is mounted to the rear surface 116 of the meter cluster mounting area 112 and connected to the instrument panel 110 by means of the apertures 120a, 120b and various attachment structures, such as a bolt. The apertures 190, 192, 194, 196 are operable to weaken the structure of the instrument panel 110 in the surrounding area of the meter cluster mounting area 112.

The instrument panel 10 includes the meter cluster mounting area 112. The meter cluster mounting area 112 includes a lower surface 114 provided on a lower panel 115. The meter cluster mounting area 112 further includes a rear surface 116 connected to the panel 117 and an upper surface 119 angled with respect to the rear surface 116. The meter cluster mounting area 112 includes an open area 118 operable to accept a meter cluster. The rear surface 116 further includes meter cluster mounting apertures 120a, 120b. The meter cluster is mounted within the open area 118 and rests on the lower surface 114. The meter cluster is mounted to the instrument panel 110 by means of the apertures 120a, 120b. Various attachment means may be provided, such as a bolt assembly, for securing the meter cluster to the meter cluster mounting area 112.

The instrument panel 110 further includes an upper portion 122 having trim mounting attachment means 124, 126. The upper portion 122 further includes a side portion 128 adding further structure to the instrument panel 110. Various attachment structures 130a, 130b are provided for attaching various instruments to the instrument panel or for attaching the instrument panel 110 to the vehicle.

Various other attachment structures are provided on a lower portion of the instrument panel 110. Attachment structures 144a, 144b are provided for either attaching various instruments to the instrument panel 110 or for attaching the instrument panel 110 to the vehicle. Further, other attachment structures 150, 152, 154, 156 are provided for the same purposes. Further, apertures 160, 170, 172 are further provided for the same purpose.

Open area 140 is provided to illustrate the area where the steering wheel, steering column, and shifter are located. Examples of the positioning are shown in FIG. 3.

FIG. 3 illustrates a front view of a meter cluster 200 mounted within the meter cluster mounting area 112. A steering wheel 218 is provided having a gripping portion 220 and an attached shifter 222 having a handle 224. The meter cluster 200 is provided having various dials 202, 204. As shown in FIG. 3, the various strategically placed weakening apertures 190, 192, 194, 196 (hereinafter referred to as 'apertures 190, 192, 194, 196') are provided adjacent to and behind the meter cluster 200. Various other apertures not shown may be provided to surround or otherwise be adjacent to the meter cluster 200. The apertures 190, 192, 194, 196 are positioned in relation to the meter cluster 200 to be placed adjacent to the outer edges of the meter cluster 200. The apertures 190, 192, 194, 196 are positioned radially outward in relation to the meter cluster 200.

The vehicle further includes a longitudinal axis. The meter cluster 200 and the gear shifter 222 rest within the longitudinal axis. The plurality of weakening apertures 190, 192, 194, 196 are positioned in relation to the longitudinal axis spaced apart from the shifter 222 and generally surrounding and extending radially outwardly from the meter cluster 200 and the outer edges of the meter cluster.

Figure 4:
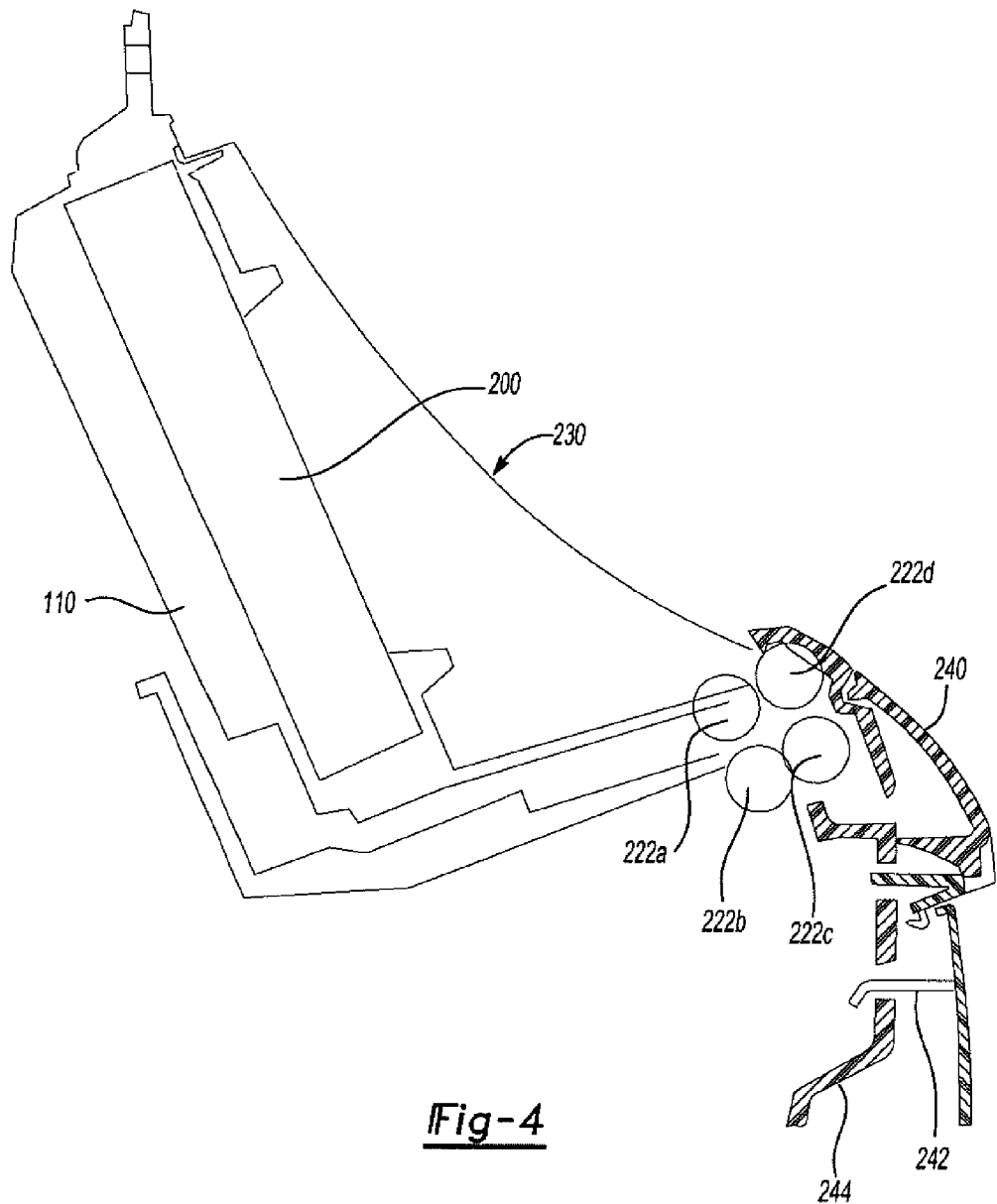
FIG. 4 illustrates a cross-sectional view along the line 4-4 as shown in FIG. 3 of the meter cluster and shifter overlap.

FIG. 4 illustrates a cross-sectional view of the meter cluster 200. The meter cluster 200 is shown mounted on the instrument panel 110. The meter cluster 200 includes a front surface 230. The front surface 230 may be glass, plastic, Plexiglas®, or the like. The front surface 230 of the meter cluster 200 is curved for various reasons, such as reducing glare. Various attachment and trim pieces 240, 242, 244 are also shown. The gear shifter 222 is shown provided in various positions 222a, 222b, 222c, 222d. These various positions are designated positions for PRNDL positioning. These various positions 222a, 222b, 222c, 222d are shown to provide the estimated crossover and overlap (or rest in front of) of the shifter 222 before it hits the meter cluster 200.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. An instrument panel assembly of an automotive vehicle, the instrument panel assembly operable to mount a meter cluster, the meter cluster positioned adjacent to a shifter of the automotive vehicle, the instrument panel assembly comprising:
    a main panel, the main panel including the meter cluster mounted thereto, the main panel further including a mounting aperture for the meter cluster, the meter cluster mounted to the mounting aperture, the main panel including a rear surface and an upper surface defining a mounting space for the meter cluster, the rear surface including the mounting aperture for the meter cluster, the upper surface extending away from the rear surface;
    a plurality of weakening apertures positioned on the main panel, the plurality of weakening apertures on the main panel located adjacent to, behind and surrounding the meter cluster, the plurality of weakening apertures positioned on the rear surface and extending onto the upper surface, the mounting apertures of the rear surface positioned between the plurality of weakening apertures operable to weaken the structure of the main panel to facilitate breakage of the main panel when the shifter hits the meter cluster in the event of an automotive vehicle accident.

2. The instrument panel assembly of claim 1 wherein one of the plurality of weakening apertures are positioned adjacent to the mounting aperture for the meter cluster.

3. The instrument panel assembly of claim 1 wherein one of the plurality of weakening apertures are positioned behind and surrounding the meter cluster.

4. The instrument panel assembly of claim 1 wherein the shifter of the automotive vehicle is positioned in front of a front face of the meter cluster operable to hit the front face of the meter cluster in the event of an accident.

5. The instrument panel assembly of claim 4 wherein the shifter of the automotive vehicle is positioned in front of the front face of the meter cluster at a lower corner of the meter cluster.

6. The instrument panel assembly of claim 1 wherein the meter cluster is positioned in the center of the main panel of the instrument panel assembly.

7. The instrument panel assembly of claim 1 wherein the meter cluster rests on a lower surface.

8. The instrument panel assembly of claim 7 wherein the meter cluster mounts to the main panel at a rear surface located on the meter cluster.

9. The instrument panel assembly of claim 8 wherein the main panel includes a compartment operable to hold the meter cluster defined by the first and the rear surfaces.

10. The instrument panel assembly of claim 1 wherein the automotive vehicle includes a longitudinal axis.

11. The instrument panel assembly of claim 10 wherein the meter cluster rests on the longitudinal axis.

12. The instrument panel assembly of claim 11 wherein the plurality of weakening apertures are spaced apart along the longitudinal axis in relation to the meter cluster.

\* \* \* \* \*